United States Patent
Gao et al.

(10) Patent No.: US 10,089,015 B1
(45) Date of Patent: Oct. 2, 2018

(54) PER-DRIVE MEMORY RESIDENT ZEROING MAPS FOR DRIVE ZEROING IN A DATA STORAGE SYSTEM

(71) Applicant: EMC IP Holding Company LLC, Hopkinton, MA (US)

(72) Inventors: Jian Gao, Beijing (CN); Peter Puhov, Shrewsbury, MA (US); Jianbin Kang, Beijing (CN); Geng Han, Beijing (CN); Hongpo Gao, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 15/392,342

(22) Filed: Dec. 28, 2016

(51) Int. Cl.
  *G06F 3/06* (2006.01)
  *G06F 12/00* (2006.01)

(52) U.S. Cl.
  CPC ............ *G06F 3/061* (2013.01); *G06F 3/0655* (2013.01); *G06F 3/0688* (2013.01); *G06F 3/0601* (2013.01)

(58) Field of Classification Search
  None
  See application file for complete search history.

(56) References Cited

U.S. PATENT DOCUMENTS

| 6,101,585 | A | 8/2000 | Brown et al. |
| 6,480,969 | B1 | 11/2002 | Hitz et al. |
| 7,424,637 | B1 | 9/2008 | Schoenthal et al. |
| 7,685,462 | B1 | 3/2010 | Leong et al. |
| 7,694,173 | B1 | 4/2010 | Schoenthal et al. |
| 2012/0137069 | A1* | 5/2012 | Galloway ........... G06F 11/1076 711/114 |

* cited by examiner

*Primary Examiner* — Brian Peugh
(74) *Attorney, Agent, or Firm* — BainwoodHuang (57) ABSTRACT

Techniques are disclosed for drive zeroing that create and maintain a memory resident zeroing map for each drive in a data storage system. The disclosed techniques create, for each drive in an array of non-volatile data storage devices, a zeroing map. The zeroing map for a drive includes multiple slots, each of which corresponds to a data storage area of the drive. Each slot in the zeroing map for a drive stores a zeroing status of the corresponding data storage area. The value of a slot in the zeroing map may indicate that the zeroing status of the corresponding data storage area is i) zeroed, indicating that the corresponding data storage area has previously been zeroed, or ii) unknown, indicating that the zeroing status of the corresponding data is unknown, i.e. the corresponding data storage area may or may not have previously been zeroed.

20 Claims, 8 Drawing Sheets

PER-DRIVE MEMORY RESIDENT ZEROING MAPS FOR DRIVE ZEROING IN A DATA STORAGE SYSTEM

TECHNICAL FIELD

The present disclosure relates generally to intelligent data storage systems, and more specifically to techniques for disk drive zeroing that creates and maintains memory resident zeroing maps for each drive that indicate whether specific areas of the drives have been zeroed.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify storage objects (e.g. logical disks or "LUNs") that are to be written, read, created, or deleted. The storage processors run software that manages incoming I/O operations and performs various data processing tasks to organize and secure the host data received from the host machines that is stored on the non-volatile data storage devices.

When the data storage system creates a new storage object, non-volatile data storage is allocated to the storage object from one or more drives in the array of non-volatile data storage devices. The non-volatile data storage allocated to the newly created storage object must be zeroed before it is accessed through newly created storage object, in order to prevent unauthorized access to data that was stored on the allocated portions of drive prior to creation of the new storage object.

SUMMARY

Unfortunately, previous systems have had significant shortcomings with regard to how they handle the zeroing of non-volatile data storage allocated to newly created storage objects. Previous data storage systems have relied on a single zeroing checkpoint for each drive, which indicates a highest data location within the drive that has been zeroed. Accordingly, processing of each host I/O operation directed to a storage object has required checking the current location of the zeroing checkpoint for the drive from which the storage object was allocated. While host I/O operations accessing drive locations at or below the zeroing checkpoint may be processed without further checking, since zeroing has already been performed on those locations, processing of all host I/O operations accessing locations above the zeroing checkpoint require reading on-disk metadata stored on the drive to determine whether the locations accessed by the host I/O operations have previously been zeroed. Accordingly, each host I/O operation that accessed a location of a drive above the zeroing checkpoint required at least one additional access to the drive, in order to check the on-disk metadata, and potentially another access to the drive to update the on-disk metadata after performing the host I/O operation. Such additional drive accesses degrade the performance of both the storage object to which the host I/O operations are directed, and also the overall performance of the drive, resulting in degraded performed for all other storage objects allocated from the same drive. As storage objects become spread across increasing numbers of drives to improve fault tolerance and reliability, the number of storage objects that may be allocated from an individual drive increases, and the scope of the performance degradation resulting from the additional accesses to non-volatile data storage performed by previous systems to obtain and update on-disk metadata used to maintain zeroing status for a drive will span even greater numbers of storage objects.

To address these and other shortcomings of previous data storage systems, new techniques are disclosed herein for drive zeroing that create and maintain a memory resident zeroing map for each drive in a data storage system. In the disclosed techniques, a data storage system includes at least one storage processor and an array of non-volatile data storage devices communicably coupled to the storage processor. The disclosed techniques create, for each drive in the array of non-volatile data storage devices, a zeroing map. The zeroing map for a drive includes multiple slots, each of which corresponds to a data storage area of the drive. Each slot in the zeroing map for a drive stores a zeroing status of the corresponding data storage area. The value of a slot in the zeroing map may indicate that the zeroing status of the corresponding data storage area is i) zeroed, indicating that the corresponding data storage area has previously been zeroed, or ii) unknown, indicating that the zeroing status of the corresponding data storage area is unknown, i.e. the corresponding data storage area may or may not have previously been zeroed. The zeroing maps of the disclosed techniques are continuously maintained within a memory of the storage processor while host I/O operations are received and processed by the data storage system.

The storage processor receives host I/O operations directed to drives in the data storage system, and each host I/O operation identifies a data storage area to be accessed on the drive to which it is directed. In response to receiving a host I/O operation, the storage processor reads a value of a slot in the zeroing map of the drive to which the host I/O operation is directed, where the slot corresponds to the data storage area identified by the host I/O operation. In response to the value of the slot indicating that the data storage area identified by the host I/O has previously been zeroed, the storage processor performs the host I/O operation by sending the host I/O operation to the array of non-volatile data storage devices for the host I/O operation to be performed on the drive. Advantageously, whenever the value of the slot in the zeroing map corresponding to the data storage area to be accessed by the host I/O operation indicates that the data storage area has previously been zeroed, the storage processor is not required to read on-disk metadata to determine whether the data storage area to be accessed by the host I/O operation has been zeroed, and accordingly no additional accesses to the drive are needed to process the host I/O operation.

In another aspect of the disclosed techniques may detect creation of a storage object (e.g. a logical disk, referred to herein as a "LUN"). Data storage areas in a drive are allocated to the storage object when the storage object is created, and the data storage areas allocated to the storage object may include the data storage area indicated by the received host I/O operation. In response to detecting creation of the storage object, the disclosed techniques may modify the values of slots in the zeroing map corresponding to data storage areas that were allocated to the storage object to indicate that the zeroing status of those data storage areas is unknown. In this way, the disclosed techniques may prevent access by a received host I/O operation to data stored in data storage areas prior allocated to the storage object to creation of the storage object. As zeroing is subsequently performed on data storage areas that were allocated to the storage object, the values of the slots in the zeroing map corresponding to those data storage area will be updated to indicate that they have been zeroed since they were most recently allocated to a data storage object, i.e. that they have been zeroed since creation of the storage object to which they are currently allocated.

In another aspect of the disclosed techniques, prior to detecting creation of the storage object, the disclosed techniques may detect a drive start-up event for the drive. Detecting the drive start-up event may, for example, consist of detecting that the drive has been added to the array of non-volatile data storage devices, or detecting that the data storage system has been booted up.

In response to detecting the drive start-up event, the disclosed techniques may initialize the values of all slots in the zeroing map for the drive to indicate that the zeroing status of all data storage areas on the drive is unknown. A background process may then be started that changes the values of slots in the zeroing map to indicate that corresponding data storage areas have been zeroed, responsive to on-disk metadata stored on the drive. The on-disk metadata stored on the drive may indicate whether individual chunks of the drive have been zeroed, where the chunks are smaller in size than the data storage areas. When the background process determines that all chunks within a given data storage area have been zeroed, the background process changes the value of the corresponding slot in the zeroing map to indicate that the data storage area has been zeroed.

In another example, the disclosed techniques may process a second host I/O operation that indicates a second data storage area to be accessed on the drive, and read a value of a second slot in the zeroing map corresponding to the second data storage area. In response to the value of the second slot in the zeroing map data storage area indicating that the zeroing status of the second data storage area is unknown, the disclosed techniques may read the on-disk metadata stored on the drive to determine whether a chunk to be accessed by the second host I/O operation has been zeroed. Responsive to the on-disk metadata indicating that the chunk to be accessed by the second host I/O operation has not been zeroed, the disclosed techniques pad data received with the second host I/O operation with zeroes to align the data size of the second host I/O operation with the size of the chunk to be accessed by the second host I/O operation, and the second host I/O operation is then sent to the array of non-volatile data storage devices for the second host I/O operation to be performed on the drive. The second host I/O operation may consist of a write operation, and sending the second host I/O operation to the drive indicated by the second host I/O operation may cause the entire chunk to be written with the padded data, thus performing an "on-demand" zeroing of the chunk.

The specific host I/O operations processed using the disclosed techniques may, for example, include write operations, and sending the host I/O operation to the drive indicated by the host I/O operation may accordingly cause data included with the host I/O operation to be written to at least a portion of the data storage area indicated by the host I/O operation. However, the disclosed techniques are not limited to processing host I/O operations that are write operations, and the host I/O operations processed using the disclosed techniques may further include read operations, and sending the host I/O operation to the drive indicated by the host I/O operation may accordingly cause data from the data storage area indicated by the host I/O operation to be returned to a host machine that issued the host I/O operation.

Embodiments of the disclosed techniques may provide significant advantages over previous approaches. The disclosed techniques do not rely on a zeroing checkpoint to determine the zeroing status of all portions of a drive, and the disclosed memory-resident zeroing map allows for a finer grained determination of whether portions of the drive have previously been zeroed when processing received host I/O operations. In this way, the disclosed techniques reduce the number of I/O operations for which additional accesses to the non-volatile data storage drive must be performed to obtain on-disk metadata that indicates whether locations within a drive have been zeroed. Accordingly, the average response time for processing host I/O operations directed to a drive may be reduced using the disclosed techniques. Reducing the number of times on-disk metadata is accessed improves overall drive performance, which impacts increasing numbers of storage objects as storage objects become spread across increasing numbers of drives to improve fault tolerance and reliability, and the number of storage objects allocated from individual drives increases as a result.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the present invention is broader than the specific embodiments disclosed below.

Figure 1:
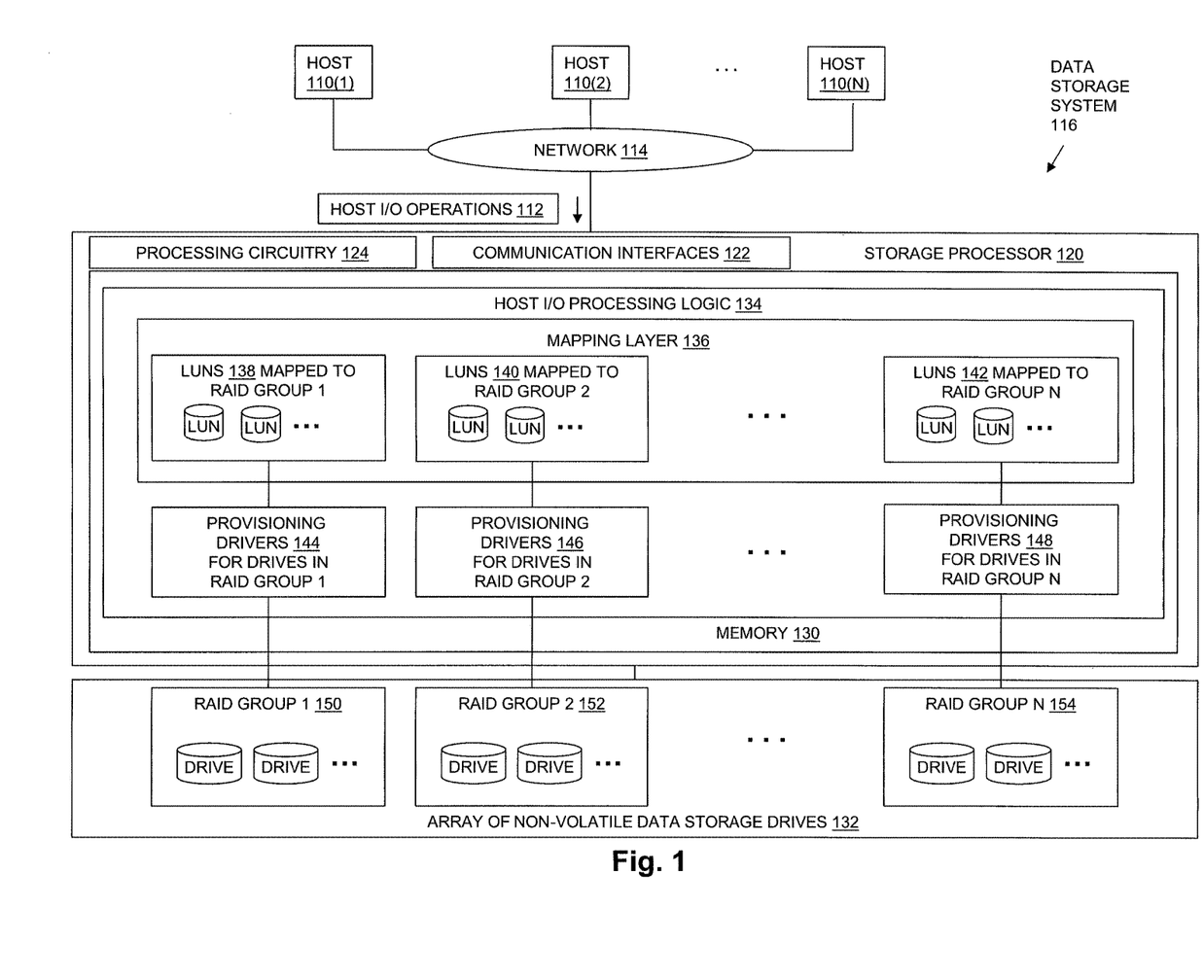
FIG. 1 is a block diagram showing an operational environment for the disclosed techniques, including an example of a data storage system in which the disclosed techniques may be embodied.

FIG. 1 is a block diagram showing an example of a data storage environment including components of an illustrative embodiment of the disclosed techniques. The data storage environment of FIG. 1 includes some number of Host Computing Devices 110, referred to as "hosts", shown for purposes of illustration by Hosts 110(1) through 110(N), that access data storage provided by Data Storage System 116, for example over one or more computer networks, such as a local area network (LAN), and/or a wide area network (WAN) such as the Internet, etc., and shown in FIG. 1 by Network 114. Data Storage System 116 includes at least one Storage Processor 120 and an Array of Non-volatile Data Storage Drives 132. Storage Processor 120 may be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations (e.g. host I/O read, host I/O write operations, create storage object operations, delete storage object, etc.).

The Array of Non-volatile Data Storage Drives 132 may include magnetic disk drives, electronic flash drives, and/or optical drives. Array of Non-volatile Data Storage Drives 132 may be directly physically connected to Storage Processor 120, or may be communicably connected to Storage Processor 120 by way of one or more computer networks, e.g. including or consisting of a Storage Area Network (SAN) or the like.

During operation, Storage Processor 120 processes Host I/O Operations 112, e.g. I/O read, I/O write, create storage object and delete storage object operations, that are received from Hosts 110 over Network 114. The host I/O operations specify storage objects that are to be written, read, created, or deleted. The storage objects specified by the host I/O operations may, for example, be logical disks referred to as "LUNs" that are served by Data Storage System 116 to Hosts 110. The host data stored in storage objects served by Data Storage System 116 is ultimately stored by Storage Processor 120 into units of non-volatile storage allocated to the storage objects from drives in the Array of Non-volatile data storage Drives 132. The units of storage allocated from Array of Non-volatile data storage Drives 132 are used to persistently store the host data indicated by host I/O operations received by Storage Processor 120.

A Memory 130 in Storage Processor 120 stores program code that is executable on Processing Circuitry 124. Memory 130 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 130 together form control circuitry, which is constructed and arranged to carry out various methods and functions as described herein. The Memory 130 stores a variety of software components that may be provided in the form of executable program code. For example, as shown in FIG. 1, Memory 130 may include software components such as Host I/O Processing Logic 134. When the program code is executed by Processing Circuitry 124, Processing Circuitry 124 is caused to carry out the operations of the software components. Although certain software components are shown and described for purposes of illustration and explanation, those skilled in the art will recognize that Memory 130 may include various other software components, such as an operating system, and various other applications, processes, etc.

Host I/O Processing Logic 134 operates to serve storage objects, such as LUNs, to the Hosts 110, such that the host I/O operations issued by Hosts 110 can specify such storage objects, as well as specific locations within such storage objects. For example, each host I/O write operation may specify and/or include not only the data to be written but also the location at which the specified data is to be written relative to the specified storage object. For example, if the specified storage object is a LUN, the host I/O write operation may specify the location at which data is to be written within the LUN as an offset into the LUN. Similarly, a host I/O read operation may specify the location within the LUN from which data is to be read and returned to the requesting host as an offset into the LUN.

Mapping Layer 136 maps the locations within each storage object to corresponding portions of non-volatile data storage allocated to the storage object from one of the drives within the Array of Non-volatile data storage Drives 132. Accordingly, through the mapping performed by Mapping Layer 136, each location specified by a received host I/O operation effectively indicates both a location within the storage object specified by the host I/O operation, and a portion of non-volatile data storage allocated from one of the drives that is used to persistently store host data at the location specified within the storage object.

In the example of FIG. 1, for purposes of illustration, Mapping Layer 136 maps LUN storage objects to non-volatile data storage allocated from a number of RAID (Redundant Array of Independent Disks) groups. Each RAID group contains a number of drives that are combined into a single logical unit for purposes of providing data redundancy and/or enhanced performance. Any specific level of RAID technology may be used with the disclosed techniques, such as, for example, RAID 0, RAID 1, RAID 2, RAID 3, RAID 4, RAID 5, and/or RAID 6, or any other specific type of RAID. Each one of the LUNs 138 are mapped to non-volatile data storage allocated from RAID Group 1 150, each one of LUNs 140 is mapped to non-volatile data storage allocated from RAID Group 2 152, and so on through LUNs 142, which are mapped to non-volatile data storage allocated from RAID Group N 154.

Also shown in FIG. 1 are provisioning drivers for each drive in the Array of Non-volatile data storage Drives 132. In the disclosed techniques, a provisioning driver is provided for each drive. For example, Provisioning Drivers 144 includes a provisioning driver for each one of the drives in RAID Group 1 150, Provisioning Drivers 146 includes a provisioning driver for each one of the drives in RAID Group 2 152, and so on, through Provisioning Drivers 148, which includes a provisioning driver for each one of the drives in RAID Group N 154.

Figure 2:
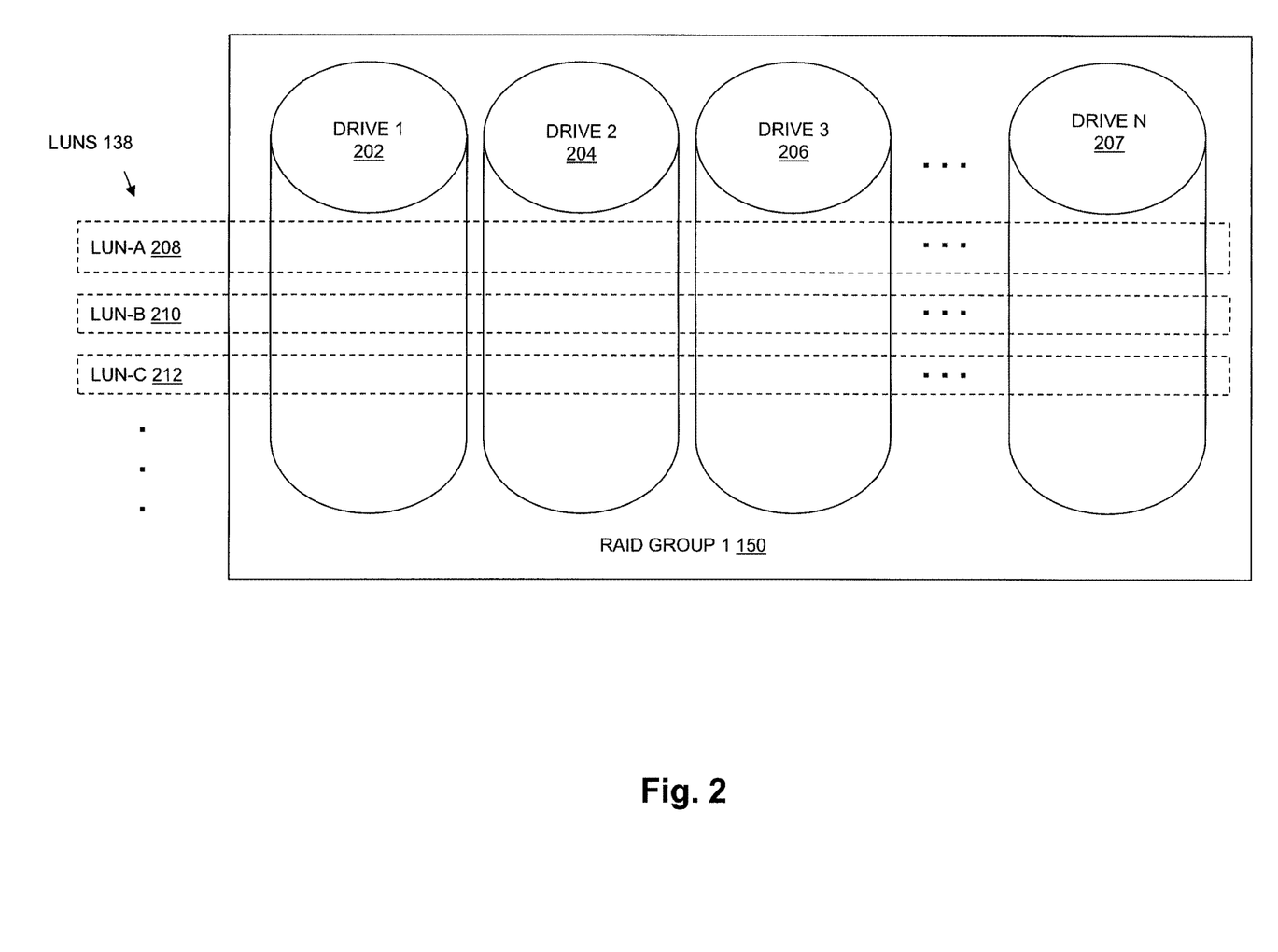
FIG. 2 is a block diagram illustrating allocation of data storage from drives in a RAID group to multiple storage objects.

FIG. 2 is a block diagram illustrating allocation of non-volatile data storage from the drives in a RAID group to multiple LUN storage objects. In the example of FIG. 2, RAID Group 1 150 includes a number of disk drives, shown by Drive 1 202, Drive 2 204, Drive 3 206, and so on through Drive N 207. LUNs 138 to which non-volatile data storage has been allocated from RAID Group 1 150 are shown to include LUN-A 208, LUN-B 210, LUN-C 212, and so on. As shown in FIG. 2, when data storage is allocated from RAID Group 1 150 to a LUN, data storage is allocated to the LUN from each drive in RAID Group 1 150, e.g. at the same locations within each drive, so that LUN data can be redundantly stored across the drives of RAID Group 1 150, in order to provide improved fault tolerance. Accordingly, when each one of LUN-A 208, LUN-B 210, and LUN-C 212 are created based on RAID Group 1 150, non-volatile data storage may be allocated from each of the drives in RAID Group 1 150. In addition, each time a new LUN is created, the non-volatile data storage allocated to the new LUN from each one of the drives in RAID Group 1 150 must be zeroed, in order to prevent data previously stored in the non-volatile data storage allocated to the new LUN from being exposed through data operations performed on the new LUN.

Figure 3:
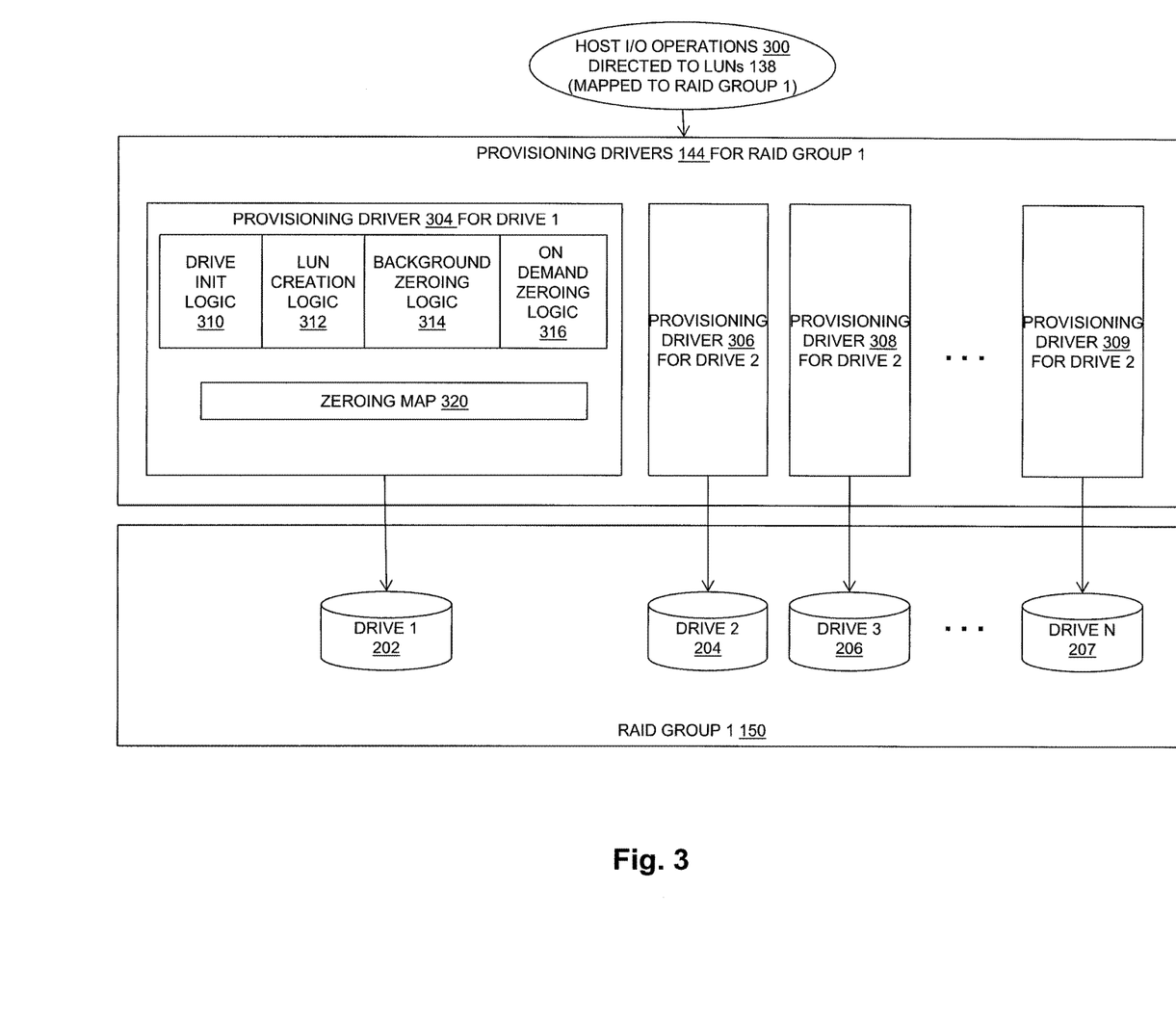
FIG. 3 is a block diagram showing an example of provisioning drivers for drives in a RAID group.

FIG. 3 is a block diagram showing an example of provisioning drivers provided for individual drives in a RAID group. In the example of FIG. 3, within Provisioning Drivers 144, a provisioning driver is provided for each one of the drives in RAID Group 1 150. Specifically, Provisioning Driver 304 is provided for Drive 1202, Provisioning Driver 306 is provided for Drive 2 204, Provisioning Driver 3 206 is provided for Drive 3 206, and so on through Provisioning Driver 309 provided for Drive N 207. An example of components contained within each of the provisioning drivers is shown for Provisioning Driver 304. In the example of FIG. 3, Provisioning Driver 304 includes but is not limited to Drive Initialization Logic 310, LUN Creation Logic 312, Background Zeroing Logic 314, and On-Demand Zeroing Logic 316. The logic within the provisioning drivers operates at least in part responsive to Host I/O Operations 300, where Host I/O Operations 300 are directed to the LUNs 138 that are mapped to non-volatile data storage allocated from RAID Group 1 150, e.g. LUN-A 208, LUN-B 210, LUN-C 212 and so on shown in FIG. 2.

Each one of the provisioning drivers also creates and maintains a zeroing map for its corresponding drive. For example, Provisioning Driver 304 is shown including Zeroing Map 320 for Drive 1 202. The zeroing maps created and maintained by the provisioning drivers are continuously maintained within the memory of the storage processor while host I/O operations (e.g. Host I/O Operations 300) are received and processed by the data storage system.

Figure 4:
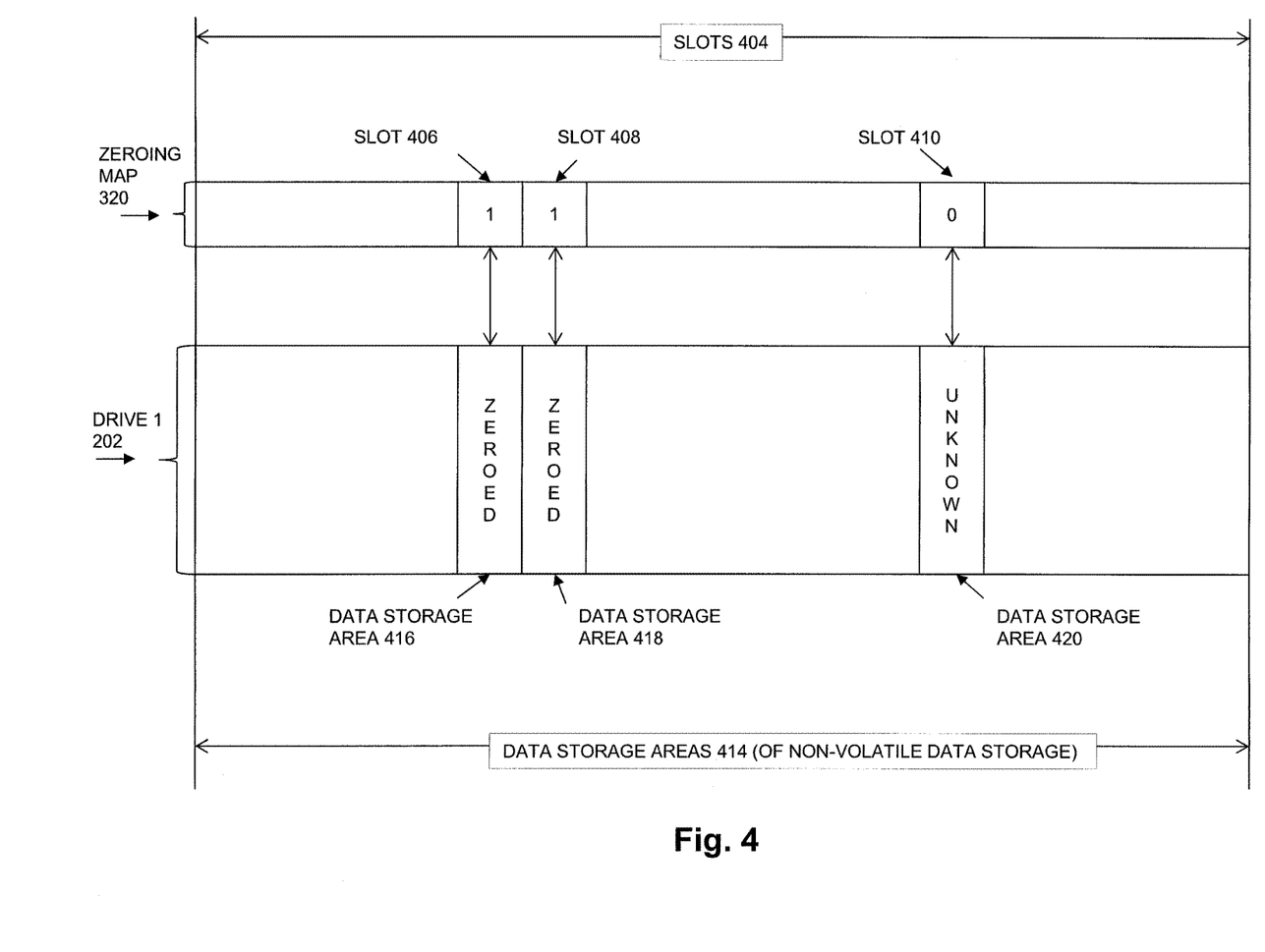
FIG. 4 is a block diagram showing an example of a zeroing map for a drive and corresponding data storage areas in the drive.

FIG. 4 is a block diagram showing an example of the Zeroing Map 320 created and maintained by Provisioning Driver 304 for Drive 1202. Zeroing Map 320 may, for example, be created by Provisioning Driver 304 in response to detection of a drive start-up event, such as insertion of Drive 1 202 into the Array of Non-Volatile Data Storage Drives 132, or boot-up of the Data Storage System 116. As shown in FIG. 4, Zeroing Map 320 includes multiple Slots 404, each one of which corresponds to a data storage area in Drive 1 202, i.e. one of the Data Storage Areas 414 of non-volatile data storage provided in Drive 1202. In the example of FIG. 4, Zeroing Map 320 is embodied as a bit map, in which each one of the Slots 404 is made up of a single bit. The Data Storage Areas 414 in Drive 1 202 are each of equal length. For example, in one configuration Drive 1 202 is a 16 terabyte disk drive, and each one of the Data Storage Areas 414 has a length of 32 gigabytes.

In the example of FIG. 4, each one of the Slots 404 in Zeroing Map 320 stores a bit indicating a zeroing status of the corresponding one of the Data Storage Areas 414. In the example of FIG. 4, a bit value of 1 in one of the Slots 404 indicates that the zeroing status of the corresponding one of the Data Storage Areas 414 is zeroed, indicating that the corresponding data storage area has been zeroed. For example, a bit value of 1 in one of the Slots 404 may indicate that the corresponding one of the Data Storage Areas 414 has been zeroed since that data storage area was most recently allocated to a LUN, e.g. at a time at which the LUN was created. For purposes of illustration, Slot 406 is shown having a bit value of 1, indicating that the non-volatile data storage of Drive 1 202 in Data Storage Area 416 has previously been zeroed, e.g. has been zeroed since Data Storage Area 416 was most recently allocated to a LUN. Similarly, Slot 408 is shown having a bit value of 1, indicating that the non-volatile data storage of Drive 1 202 in Data Storage Area 418 has previously been zeroed, e.g. has been zeroed since Data Storage Area 418 was most recently allocated to a LUN. As further described below, host I/O operations within Host I/O Operations 300 that indicate locations to be accessed within data storage areas of Drive 1 202 that correspond to slots having a bit value of 1 (e.g. Data Storage Area 416 and Data Storage Area 418) may advantageously be passed directly to the Array of Non-Volatile Data Storage Drives 132 to be performed on Drive 1 202 without the need to access any on-disk metadata stored on Drive 1 202 to determine the zeroing status of the accessed locations.

Further in the example of FIG. 4 a bit value of 0 in one of the Slots 404 indicates that the zeroing status of the corresponding data storage area is unknown, indicating that the zeroing status of the corresponding data is unknown, i.e. that the corresponding data storage area may or may not have been zeroed. For purposes of illustration, Slot 410 is shown having a bit value of 0, indicating that the non-volatile data storage of Drive 1 202 in Data Storage Area 420 may or may not have previously been zeroed, e.g. may or may not have been zeroed since Data Storage Area 416 was most recently allocated to a LUN. As further described below, host I/O operations within Host I/O Operations 300 that indicate locations to be accessed within data storage areas of Drive 1 202 that correspond to slots having a bit value of 0 require that on-disk metadata stored on Drive 1 202 be examined to determine the zeroing status of the accessed locations.

Figure 5:
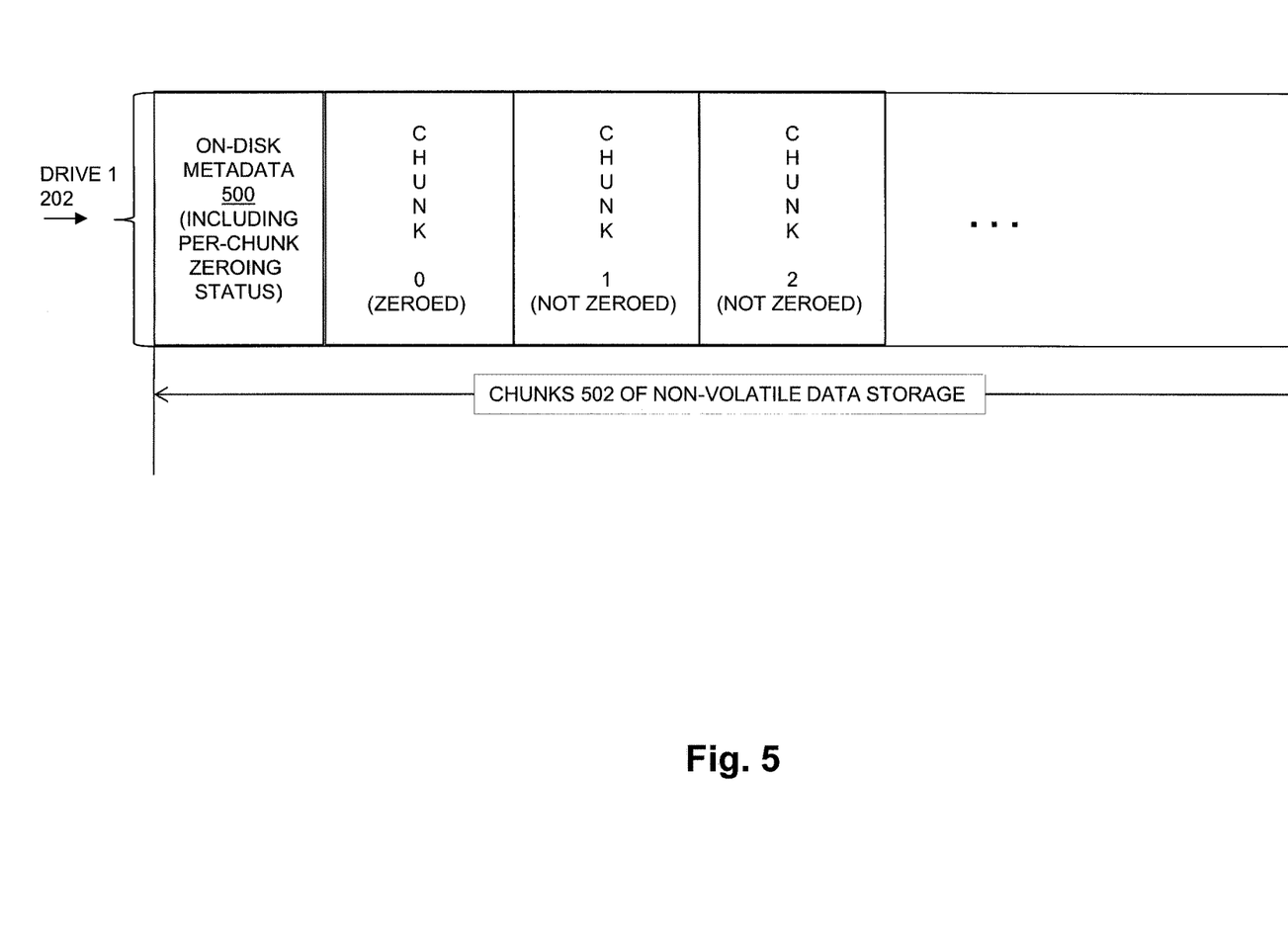
FIG. 5 is a block diagram showing an example of on-disk metadata stored on a drive, and chunks of data storage within the drive.

FIG. 5 is a block diagram showing an example of on-disk metadata stored on a drive, and indicating the zeroing status of individual chunks of data storage within the drive, and also showing examples of chunks of data storage within the drive. In the example of FIG. 5, On-Disk Metadata 500 is stored on Drive 402. On-Disk Metadata 500 includes indications of whether each one of the Chunks 502 of non-volatile data storage in Drive 402 has previously been zeroed, e.g. whether each chunk has been zeroed since it was most recently allocated to a LUN. Each chunk of non-volatile data storage in Drive 402 has the same length, which is less than the length of one of the Data Storage Areas 414. For example, each chunk in Chunks 502 may have a length of 1 megabyte. In the example of FIG. 5, On-Disk Metadata 500 indicates that Chunk 0 has been zeroed, but that Chunk 1 and Chunk 2 have not been zeroed.

Figure 6:
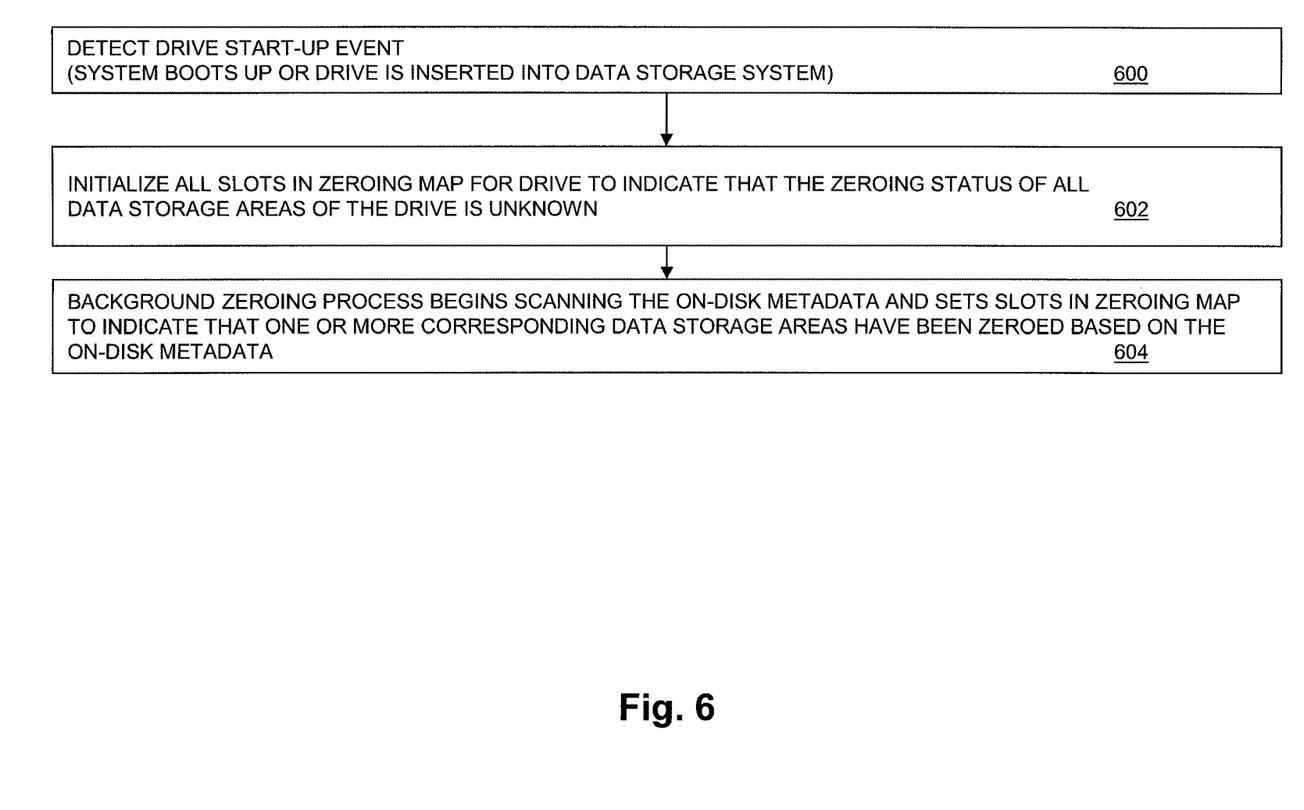
FIG. 6 is a flow chart showing an example of steps performed by the disclosed techniques in response to detecting a drive start-up event.

FIG. 6 is a flow chart showing an example of steps performed by the disclosed techniques in response to detecting a drive start-up event. The steps of FIG. 6 may, for example, be performed with regard to Drive 1 202 by the Drive Initialization Logic 310 shown in FIG. 3. As shown in FIG. 6, at step 600 Drive Initialization Logic 310 detects a drive start-up event for Drive 1 202, such as Drive 1 202 being inserted into the Array of Non-Volatile Data Storage Drives 132, or Data Storage System 116 booting up. At step 602, Drive Initialization Logic 310 creates a zeroing map for Drive 1 202, e.g. Zeroing Map 320, and initializes all slots in the zeroing map to indicate that the zeroing status of all data storage areas in Drive 1 202 is unknown. At step 604, Drive Initialization Logic 310 starts up a background zeroing process, e.g. by executing Background Zeroing Logic 314 shown in FIG. 3. The background zeroing process executes opportunistically, e.g. at times when shared system resources within the data storage system (e.g. Processing Circuitry 124, Communication Interfaces 122, Array of Non-Volatile Data Storage Drives 132, etc.) are not needed to service received host I/O operations, so that operation of the background zeroing process does not adversely impact the performance of the data storage system with regard to servicing received host I/O operations. The background zeroing process scans the On-Disk Metadata 500 to determine which chunks within Drive 1 202 have not previously been zeroed. The background zeroing process may then write zeros to those chunks that have not previously been zeroed, e.g. that have not been zeroed since they were most recently allocated to a storage object. The background zeroing process may further operate to determine when all the chunks within a data storage area of Drive 1 202 have been zeroed since they were most recently allocated to a LUN. In response to determining that all chunks within a data storage area of Drive 1 202 have been zeroed since they were last allocated to a LUN, the background zeroing process modifies the value of the corresponding slot in Zeroing Map 320 to indicate that the zeroing status of the data storage area is zeroed. In this way the background process continuously scans On-Disk Metadata 500 in the background, and sets slots in Zeroing Map 320 to indicate in Zero Map 320 that data storage areas in Data Storage Areas 414 have been zeroed based on the contents of On-Disk Metadata 500.

Figure 7:
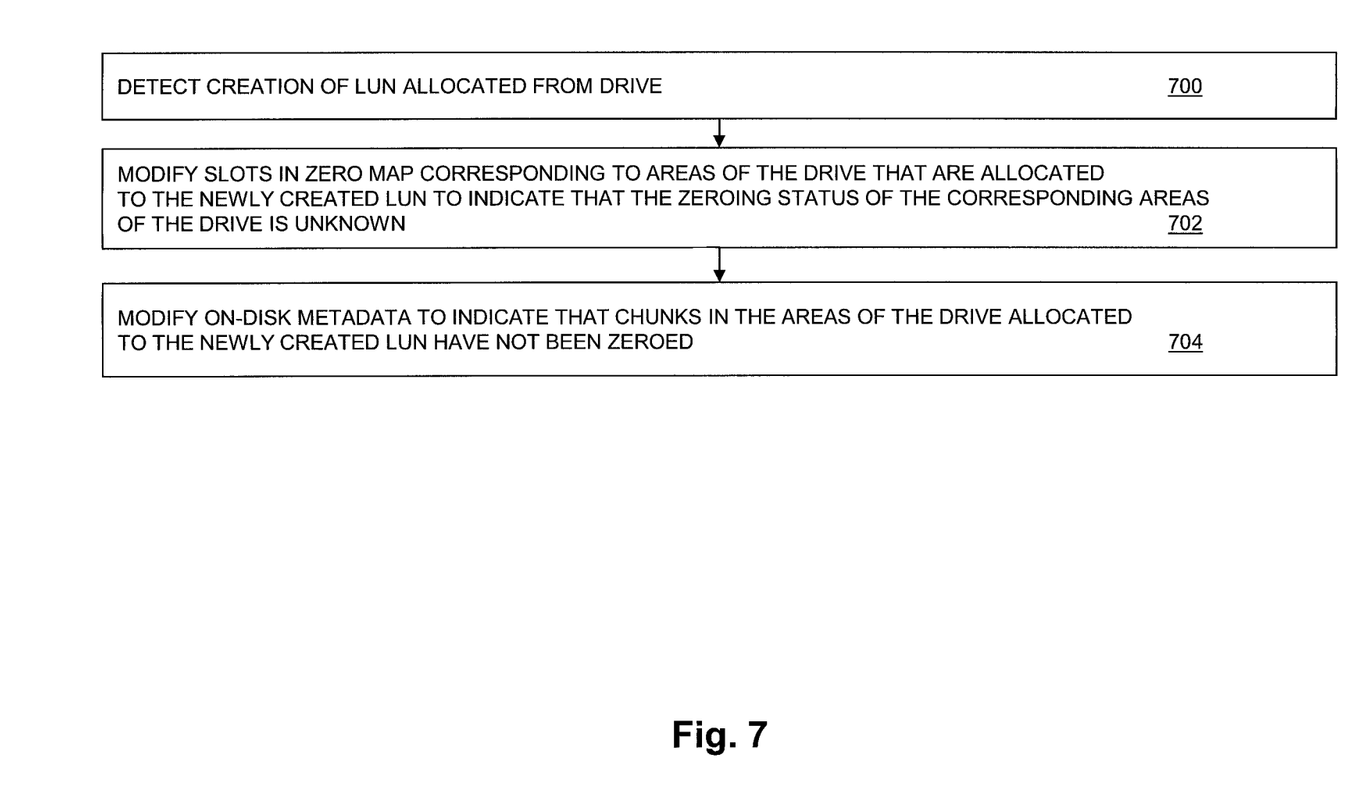
FIG. 7 is a flow chart showing an example steps performed by the disclosed techniques in response to detecting creation of a storage object.

FIG. 7 is a flow chart showing an example of steps performed by the disclosed techniques in response to detecting creation of a storage object. The steps of FIG. 7 may, for example, be performed after the steps of FIG. 6, by the LUN Creation Logic 312 shown in FIG. 3. The steps of FIG. 7 may be performed in response to LUN Creation Logic 312 detecting at step 700 receipt by Data Storage System 116 of a host I/O operation requesting creation of a LUN with data storage resources allocated from Raid Group 1 150, and thus requesting allocation of non-volatile data storage from Drive 1 202 to the newly created LUN, e.g. to LUN-A 208 at the time LUN-A 208 is created. At step 702, LUN Creation Logic 312 modifies those slots in Zeroing Map 320 that correspond to those data storage areas in Data Storage Areas 414 that are allocated to the newly created LUN (e.g. to LUN-A 208), in order to indicate that the zeroing status of the corresponding areas of the drive are unknown. At step 704, On-Disk Metadata 500 may also be modified to indicate that all chunks of Drive 1 202 that are in the data storage areas of Drive 1 202 allocated to LUN-A 208 have not been zeroed since they were most recently allocated to a storage object.

In the steps of FIG. 7, LUN Creation Logic 312 maintains the contents of Zeroing Map 320 and On-Disk Metadata 500 to prevent access by host I/O operations directed to LUN-A 208 to data stored on Drive 1 202 prior to creation of LUN-A 208. As zeroing is subsequently performed on the data storage areas allocated to LUN-A 208 (e.g. by the background zeroing process and/or by "on-demand" zeroing performed in response to host I/O write operations as described below), the values of the slots in Zeroing Map 320 corresponding to data storage areas that have been zeroed since they were allocated to LUN-A 208 are updated accordingly, i.e. to indicate that those data storage areas have been zeroed since the creation of the storage object to which they were most recently allocated.

Figure 8:
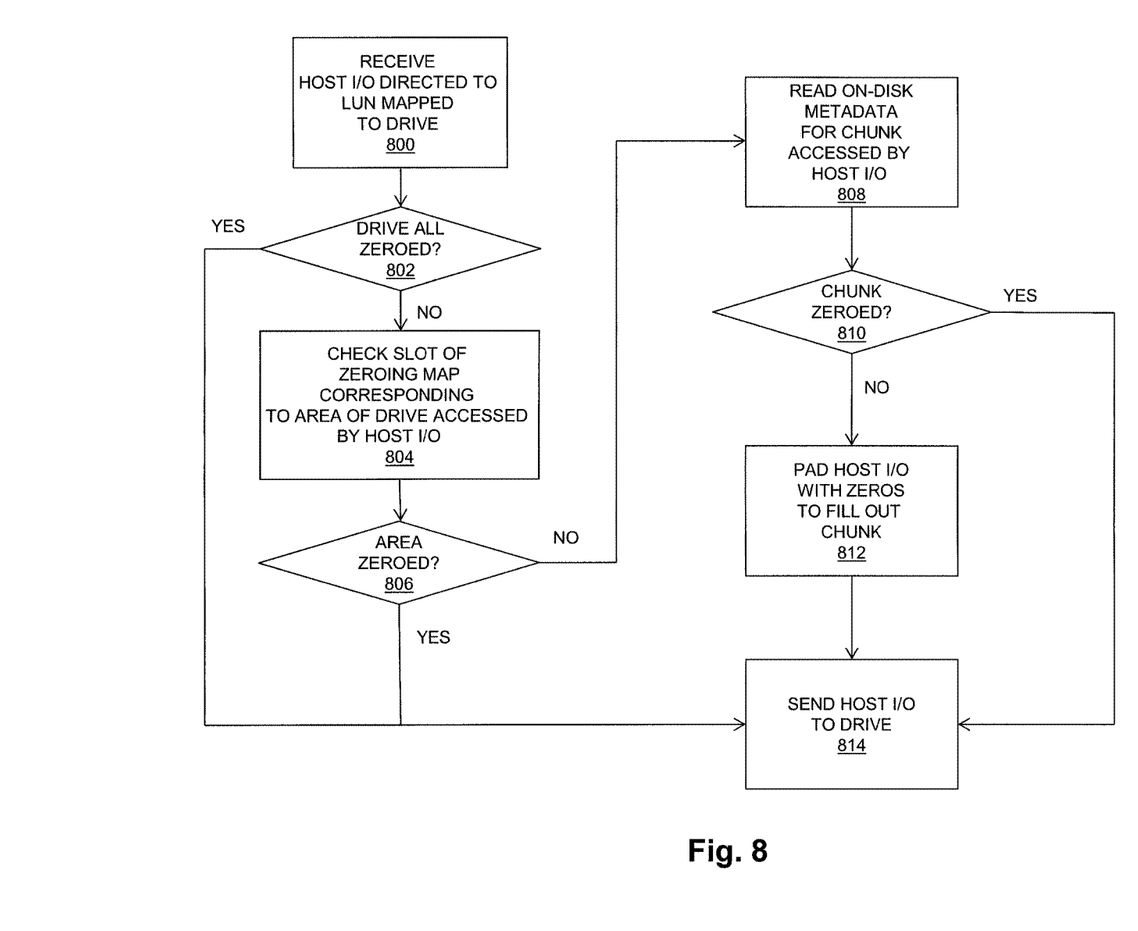
FIG. 8 is a flow chart showing an example of steps performed by the disclosed techniques to process received host I/O operations.

FIG. 8 is a flow chart showing an example of steps performed by the disclosed techniques to process received host I/O operations. The steps of FIG. 8 may, for example, be performed after the steps of FIGS. 6-7. At step 800, a host I/O operation (e.g. one of Host I/O Operations 300) is received that indicates Drive 1 202 and a data storage area within Drive 1 202 that is to be accessed by the host I/O operation. For example, a host I/O operation may be received that is directed to LUN-A 208, and Mapping Layer 136 may determine that LUN-A 208 is allocated from Drive 1 202 (i.e. from RAID Group 1 150). Mapping Layer 136 may also determine the specific data storage area within Drive 1 202 to be accessed by the host I/O operation, i.e. a data storage area within Drive 1 202 that stores the data at the offset into LUN-A 208 indicated by the host I/O operation. Because the host I/O operation indicates a data storage area in Drive 1 202 that is to be accessed by the host I/O operation, the host operation is passed to Provisioning Driver 304 to determine whether the data storage area to be accessed has previously been zeroed.

At step 802, Provisioning Driver 304 may read a value maintained by Provisioning Driver 304 indicating whether all data storage areas in Drive 1 202 have previously been zeroed, e.g. have been zeroed since they were most recently allocated to a storage object. For example, Provisioning Driver 304 may maintain an "all zeroed" flag zeroed in the Memory 130 of Storage Processor 120, the value of which indicates whether or not all data storage areas in Drive 1 202 have previously been zeroed. The flag may be initially be set to "false" when Drive 1 202 is inserted into the Array of Non-Volatile Data Storage Drives 132, and/or when Data Storage System 116 boots up, to indicate that not all data storage areas in Drive 1 202 have previously been zeroed (this step may, for example, be performed by Drive Initialization Logic 310 in FIG. 3). When the background zeroing process determines that all data storage areas in Drive 1 202 have previously been zeroed, the background zeroing process may change the flag to "true". Similarly, when LUN Creation Logic 312 subsequently allocates one or more data storage areas from Drive 1 202 to a newly created LUN, it may set the flag to "false". In response to the "all zeroed" flag having a value of "true", step 802 is followed by step 814, in which Provisioning Driver 304 causes the Storage Processor 120 to perform the host I/O operation by sending the host I/O operation to the Array of Non-Volatile Data Storage Devices 132, in order for the host I/O operation to be performed on Drive 1 202. When the value of the "all zeroed" flag indicates that Drive 1 202 has been completely zeroed, Storage Processor 120 need not read either the Zeroing Map 320 or the On-Disk Metadata 500 to determine whether the data storage area to be accessed by the host I/O operation has previously been zeroed.

Alternatively, when the "all zeroed" flag has a value of "false", then step 802 is followed by step 804. At step 804, the Provisioning Driver 304 reads the value stored in a slot within Zeroing Map 320 corresponding to the data storage area in Drive 1 202 to be accessed by the host I/O operation, and at step 806 Provisioning Driver 304 checks the value read from the slot within Zeroing Map 320 corresponding to the data storage area to be accessed by the host I/O operation. In response to the value of the slot indicating that the data storage area to be accessed by the host I/O operation has been zeroed, step 806 is followed by step 814, in which Provisioning Driver 304 causes Storage Processor 120 to perform the host I/O operation by sending the host I/O operation to the Array of Non-Volatile Data Storage Devices 132, in order for the host I/O operation to be performed on Drive 1 202. When the value of the slot in Zeroing Map 320 corresponding to the data storage area to be accessed by the host I/O operation indicates that the data storage area has previously been zeroed (e.g. since the allocation of the data storage area to LUN-A 208), Storage Processor 120 need not read On-Disk Metadata 500 to determine whether the data storage area to be accessed by the host I/O operation has previously been zeroed.

Alternatively, in response to a determination that the value of the slot indicating that the zeroing status of the data storage area to be accessed by received host I/O operation is unknown, step 806 is followed by step 808. In step 808 the Provisioning Driver 304 reads On-Disk Metadata 500 stored on Drive 1 202 to determine at step 810 whether a chunk of non-volatile data storage in Drive 1 202 to be accessed by the host I/O operation has been zeroed. If the On-Disk Metadata 500 indicates that the chunk of non-volatile data storage in Drive 1 202 to be accessed by the host I/O operation has previously been zeroed (e.g. has been zeroed since it was most recently allocated to a LUN), then step 810 is followed by step 814, in which Provisioning Driver 304 causes the Storage Processor 120 to perform the host I/O operation by sending the host I/O operation to the Array of Non-Volatile Data Storage Devices 132, in order for the host I/O operation to be performed on Drive 1 202. Since the chunk of non-volatile storage in Drive 1 202 to be accessed by the host I/O operation had previously been zeroed, there is no need to perform the "on-demand" zeroing performed at the chunk granularity as described below with reference to step 812.

Alternatively, in response to the On-Disk Metadata 500 indicating that the chunk of non-volatile data storage in Drive 1 202 to be accessed by the host I/O operation has not previously been zeroed, step 810 is followed by step 812, in which the Provisioning Driver 304 performs "on-demand" zeroing of the chunk to be accessed by the host I/O operation. Step 812 may be performed by the On Demand Zeroing Logic 316 shown in FIG. 3. For example, at step 812, in the case of a host I/O operation that is a write operation, On Demand Zeroing Logic 316 pads the host data to be written to Drive 1 202 with zeros so that the size of host I/O operation equals the size of the chunk of non-volatile data storage to be accessed by the host I/O operation. Accordingly, the size of a host I/O operation having a size that is less than the size of each of the Chunks 502 shown in FIG. 5 is increased to the size of the Chunks 502, e.g. to 1 megabyte, and zeros are prepended and appended to the host data received with the host I/O operation as needed to align the write data to a complete chunk of the drive. Step 812 is followed by step 814, in which the On-Demand Zeroing Logic 316 completes the on-demand zeroing of the chunk accessed by the host I/O operation, by sending the now chunk-sized and chunk-aligned host I/O operation to the Array of Non-Volatile Data Storage Devices 132, in order for the modified host I/O operation to be performed on Drive 1202, on the entire chunk accessed by the host I/O operation. Since the accessed chunk has then been zeroed since it was last allocated to LUN-A 208, On Demand Zeroing Logic 316 may also modify On-Disk Metadata 500 to indicate that the chunk has now been zeroed.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of drive zeroing in a data storage system, wherein the data storage system includes a storage processor and an array of non-volatile data storage devices communicably coupled to the storage processor, the method comprising:
creating, for each drive in the array of non-volatile data storage devices, a zeroing map, wherein the zeroing map includes a plurality of slots, wherein each slot corresponds to one of a plurality of data storage areas in the respective drive and stores a zeroing status of the corresponding data storage area, and wherein each zeroing map is stored in a memory of the storage processor;

receiving, by the storage processor, a host I/O operation, wherein the host I/O operation indicates a drive in the array of non-volatile data storage devices and a data storage area to be accessed on the drive;

reading, in response to receipt of the host I/O operation, a value of a slot in the zeroing map corresponding to the data storage area to be accessed by the host I/O operation;

in response to the value of the slot in the zeroing map corresponding to the data storage area to be accessed by the host I/O operation indicating that the data storage area to accessed by the host I/O has been zeroed, sending the host I/O operation to the array of non-volatile data storage devices to perform the host I/O operation on the drive;

prior to receipt of the host I/O operation, detecting creation of a storage object, wherein some of the data storage areas in the drive are allocated to the storage object when the storage object is created, and wherein the data storage areas allocated to the storage object include the data storage area indicated by the host I/O operation; and in response to detecting creation of the storage object, modifying the values of slots in the zeroing map corresponding to data storage areas that were allocated to the storage object to indicate that the zeroing status of the data storage areas that were allocated to the storage object is unknown.

2. The method of claim 1 wherein the value of the slot in the zeroing map corresponding to the data storage area indicated by the host I/O operation indicates that the data storage area on the drive accessed by the host I/O has been zeroed since the storage object was created.

3. The method of claim 2, further comprising:
prior to detecting creation of the storage object, detecting a drive start-up event associated with the drive;
in response to detecting the drive start-up event, initializing the values of all slots in the zeroing map for the drive to indicate that the zeroing status of all data storage areas on the drive is unknown; and
starting a background process that changes the values of slots in the zeroing map for the drive to indicate that corresponding data storage areas have been zeroed in response to on-disk metadata stored on the drive, wherein the on-disk metadata stored on the drive indicates whether individual ones of a plurality of chunks of the drive have been zeroed, wherein the chunks of the drive each have a size that is less than a size of each of the data storage areas on the disk.

4. The method of claim 3, wherein detecting the drive start-up event associated with the drive comprises detecting that the drive has been added to the array of non-volatile data storage devices.

5. The method of claim 3, further comprising:
receiving, by the storage processor, a second host I/O operation, wherein the second host I/O operation indicates a second data storage area to be accessed on the drive;
reading, in response to receipt of the second host I/O operation, a value of a second slot in the zeroing map corresponding to the second data storage area; and in response to the value of the second slot in the zeroing map corresponding to the second data storage area indicating that the zeroing status of the second data storage area is unknown:
reading the on-disk metadata stored on the drive to determine whether a chunk of the drive to be accessed by the second host I/O operation has been zeroed,
in response to the on-disk metadata indicating that the chunk to be accessed by the second host I/O operation has not been zeroed, padding data received with the second host I/O operation with zeroes to align the data size of the second host I/O operation with the size of the chunk to be accessed by the second host I/O operation; and
sending the second host I/O operation to the array of non-volatile data storage devices to perform the second host I/O operation on the drive.

6. The method of claim 5, wherein the second host I/O operation comprises a write operation and wherein sending the second host I/O operation to the drive indicated by the second host I/O operation causes the entire chunk to be written.

7. The method of claim 1, wherein the host I/O operation comprises a write operation and wherein sending the host I/O operation to the drive indicated by the host I/O operation causes data included with the host I/O operation to be written to the data storage area indicated by the host I/O operation.

8. The method of claim 1, wherein the host I/O operation comprises a read operation and wherein sending the host I/O operation to the drive indicated by the host I/O operation causes data from the data storage area indicated by the host I/O operation to be returned to a host that issued the host I/O operation.

9. A data storage system, comprising:
a storage processor including processing circuitry and a memory;
an array of non-volatile data storage drives communicably coupled to the storage processor; and
wherein the storage processor is configured to
create, for each drive in the array of non-volatile data storage devices, a zeroing map, wherein the zeroing map includes a plurality of slots, wherein each slot corresponds to one of a plurality of data storage areas in the respective drive and stores a zeroing status of the corresponding data storage area, and wherein each zeroing map is stored in the memory of the storage processor;
receive a host I/O operation, wherein the host I/O operation indicates a drive in the array of non-volatile data storage devices and a data storage area to be accessed on the drive;
read, in response to receipt of the host I/O operation, a value of a slot in the zeroing map corresponding to the data storage area to be accessed by the host I/O operation;
in response to the value of the slot in the zeroing map corresponding to the data storage area to be accessed by the host I/O operation indicating that the data storage area to accessed by the host I/O has been zeroed, send the host I/O operation to the array of non-volatile data storage devices to perform the host I/O operation on the drive;
prior to receipt of the host I/O operation, detect creation of a storage object, wherein some of the data storage areas in the drive are allocated to the storage object when the storage object is created, and wherein the data storage areas allocated to the storage object include the data storage area indicated by the host I/O operation; and in response to detecting creation of the storage object, modify the values of slots in the zeroing map corresponding to data storage areas that were allocated to the storage object to indicate that the zeroing status of the data storage areas that were allocated to the storage object is unknown.

10. The data storage system of claim 9 wherein the value of the slot in the zeroing map corresponding to the data storage area indicated by the host I/O operation indicates that the data storage area on the drive accessed by the host I/O has been zeroed since the storage object was created.

11. The data storage system of claim 10, wherein the storage processor is further configured to:

prior to detecting creation of the storage object, detect a drive start-up event associated with the drive;

in response to detecting the drive start-up event, initialize the values of all slots in the zeroing map for the drive to indicate that the zeroing status of all data storage areas on the drive is unknown; and start a background process that changes the values of slots in the zeroing map for the drive to indicate that corresponding data storage areas have been zeroed in response to on-disk metadata stored on the drive, wherein the on-disk metadata stored on the drive indicates whether individual ones of a plurality of chunks of the drive have been zeroed, wherein the chunks of the drive each have a size that is less than a size of each of the data storage areas on the disk.

12. The data storage system of claim 11, wherein the storage processor is further configured to detect the drive start-up event associated with the drive at least in part by detecting that the drive has been added to the array of non-volatile data storage devices.

13. The data storage system of claim 11, wherein the storage processor is further configured to:

receive a second host I/O operation, wherein the second host I/O operation indicates a second data storage area to be accessed on the drive;

read, in response to receipt of the second host I/O operation, a value of a second slot in the zeroing map corresponding to the second data storage area; and in response to the value of the second slot in the zeroing map corresponding to the second data storage area indicating that the zeroing status of the second data storage area is unknown:

read the on-disk metadata stored on the drive to determine whether a chunk of the drive to be accessed by the second host I/O operation has been zeroed, in response to the on-disk metadata indicating that the chunk to be accessed by the second host I/O operation has not been zeroed, pad data received with the second host I/O operation with zeroes to align the data size of the second host I/O operation with the size of the chunk to be accessed by the second host I/O operation; and send the second host I/O operation to the array of non-volatile data storage devices to perform the second host I/O operation on the drive.

14. The data storage system of claim 13, wherein the second host I/O operation comprises a write operation and wherein sending the second host I/O operation to the drive indicated by the second host I/O operation causes the entire chunk to be written.

15. The data storage system of claim 9, wherein the host I/O operation comprises a write operation and wherein sending the host I/O operation to the drive indicated by the host I/O operation causes data included with the host I/O operation to be written to the data storage area indicated by the host I/O operation.

16. The data storage system of claim 9, wherein the host I/O operation comprises a read operation and wherein sending the host I/O operation to the drive indicated by the host I/O operation causes data from the data storage area indicated by the host I/O operation to be returned to a host that issued the host I/O operation.

17. A computer program product, comprising:

a non-transitory computer readable medium storing a set of instructions for performing drive zeroing in a data storage system, wherein the data storage system includes a storage processor and an array of non-volatile data storage devices communicably coupled to the storage processor, the set of instructions, when carried out by at least one processor in the storage processor, causing the storage processor to perform a method of:

creating, for each drive in the array of non-volatile data storage devices, a zeroing map, wherein the zeroing map includes a plurality of slots, wherein each slot corresponds to one of a plurality of data storage areas in the respective drive and stores a zeroing status of the corresponding data storage area, and wherein each zeroing map is stored in a memory of the storage processor;

receiving, by the storage processor, a host I/O operation, wherein the host I/O operation indicates a drive in the array of non-volatile data storage devices and a data storage area to be accessed on the drive;

reading, in response to receipt of the host I/O operation, a value of a slot in the zeroing map corresponding to the data storage area to be accessed by the host I/O operation;

in response to the value of the slot in the zeroing map corresponding to the data storage area to be accessed by the host I/O operation indicating that the data storage area to accessed by the host I/O has been zeroed, sending the host I/O operation to the array of non-volatile data storage devices to perform the host I/O operation on the drive;

prior to receipt of the host I/O operation, detecting creation of a storage object, wherein some of the data storage areas in the drive are allocated to the storage object when the storage object is created, and wherein the data storage areas allocated to the storage object include the data storage area indicated by the host I/O operation; and in response to detecting creation of the storage object, modifying the values of slots in the zeroing map corresponding to data storage areas that were allocated to the storage object to indicate that the zeroing status of the data storage areas that were allocated to the storage object is unknown.

18. The computer program product of claim 17, wherein the value of the slot in the zeroing map corresponding to the data storage area indicated by the host I/O operation indicates that the data storage area on the drive accessed by the host I/O has been zeroed since the storage object was created.

19. The computer program product of claim 18, wherein the method caused to be performed by the storage processor when the set of instructions stored on the non-transitory computer readable medium is carried out by the at least one processor in the storage processor further comprises:

prior to detecting creation of the storage object, detecting a drive start-up event associated with the drive;

in response to detecting the drive start-up event, initializing the values of all slots in the zeroing map for the drive to indicate that the zeroing status of all data storage areas on the drive is unknown; and starting a background process that changes the values of slots in the zeroing map for the drive to indicate that corresponding data storage areas have been zeroed in response to on-disk metadata stored on the drive, wherein the on-disk metadata stored on the drive indicates whether individual ones of a plurality of chunks of the drive have been zeroed, wherein the chunks of the drive each have a size that is less than a size of each of the data storage areas on the disk.

20. The computer program product of claim 19, wherein the method caused to be performed by the storage processor when the set of instructions stored on the non-transitory computer readable medium is carried out by the at least one processor in the storage processor further comprises detecting the drive start-up event associated with the drive at least in part by detecting that the drive has been added to the array of non-volatile data storage devices.

\* \* \* \* \*